United States Patent
Bartetzko et al.

(10) Patent No.: US 10,732,312 B2
(45) Date of Patent: Aug. 4, 2020

(54) PREDICTION OF FORMATION AND STRATIGRAPHIC LAYERS WHILE DRILLING

(71) Applicants: Anne Bartetzko, Celle (DE); Stefan Wessling, Hannover (DE)

(72) Inventors: Anne Bartetzko, Celle (DE); Stefan Wessling, Hannover (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 822 days.

(21) Appl. No.: 14/717,162

(22) Filed: May 20, 2015

(65) Prior Publication Data

US 2016/0341834 A1 Nov. 24, 2016

(51) Int. Cl.
*G01V 1/50* (2006.01)

(52) U.S. Cl.
CPC ........................... *G01V 1/50* (2013.01)

(58) Field of Classification Search
CPC .................................. G01V 1/40; E21B 7/068
USPC .................................................. 702/7; 175/10
See application file for complete search history.

(56) References Cited

U.S. PATENT DOCUMENTS

| | | | |
|---|---|---|---|
| 5,812,068 A * | 9/1998 | Wisler | E21B 7/068 175/40 |
| 6,012,017 A * | 1/2000 | Van Bemmel | G01V 1/48 235/462.15 |
| 6,985,814 B2 | 1/2006 | McElhinney | |
| 7,093,672 B2 | 8/2006 | Seydoux et al. | |
| 7,366,616 B2 | 4/2008 | Bennett et al. | |
| 7,983,885 B2 | 7/2011 | Suarez-Rivera et al. | |
| 8,321,130 B2 | 11/2012 | Hill et al. | |
| 2003/0055568 A1 | 3/2003 | Zauderer et al. | |

(Continued)

FOREIGN PATENT DOCUMENTS

| RU | 2135766 C1 | 8/1999 |
|---|---|---|
| WO | 2013019174 A1 | 2/2013 |

OTHER PUBLICATIONS

Notification of Transmittal of the International Search Report and the Written Opinion of the International Searching Authority, or the Declaration; PCT/US16/033042, dated Sep. 2, 2016; 14 pages.

(Continued)

*Primary Examiner* — Regis J Betsch
*Assistant Examiner* — Kaleria Knox
(74) *Attorney, Agent, or Firm* — Cantor Colburn LLP

(57) ABSTRACT

An embodiment of a method of predicting a location of one or more features of an earth formation during a downhole operation includes acquiring reference data and identifying one or more reference data sections, each reference data section corresponding to a feature of interest and having an associated depth or depth interval, deploying a drilling assembly and drilling a target borehole in the earth formation, and performing measurements during the operation by a downhole measurement device to generate measurement data. The method also includes performing one or more correlations of the one or more measurement data sections with one or more reference data sections; and predicting at least one of a depth of a subsequent feature of interest located beyond a current carrier depth and a point in time of a future event associated with the subsequent feature of interest based on the correlation.

15 Claims, 11 Drawing Sheets

(56) References Cited

U.S. PATENT DOCUMENTS

| | | |
|---|---|---|
| 2004/0225442 A1 | 11/2004 | Tobias et al. |
| 2009/0119018 A1 | 5/2009 | Priezzhev et al. |
| 2009/0319243 A1 | 12/2009 | Rivera-Suarez et al. |
| 2013/0035863 A1 | 2/2013 | Selman et al. |
| 2014/0156192 A1 | 6/2014 | Cheskis et al. |
| 2015/0134255 A1* | 5/2015 | Zhang .................... G01V 1/40 702/7 |

OTHER PUBLICATIONS

McLennan, Jason A.; "Using the Varogram to Establish the Stratigraphic Correlation Structure"; 2004; Retrived from the Internet; URL:http//www.ccgalberta.com/.../report06/2004-106-stratigraphic_variograms.pdf; 7 pages.

Serra et al. "Sedimentological Analysis of Shale-Sand Series From Well Logs", SPWLA Sixteenth Annual Logging Symposium, Jun. 4-7, 1975 (23 pages).

European Search Report for European Application No. 16797202.5, International Filing Date May 18, 2016, dated Dec. 6, 2018, 10 pages.

* cited by examiner

PREDICTION OF FORMATION AND STRATIGRAPHIC LAYERS WHILE DRILLING

BACKGROUND

Boreholes or wells are drilled in earth formations for exploration, and for stimulation and production of hydrocarbons. Boreholes are usually drilled along predetermined paths and the drilling of a typical borehole proceeds through various formations and stratigraphic layers. A drilling operator typically controls surface-controlled drilling operational parameters, such as the weight on bit, drilling fluid flow rates, drill string rotational speeds and drilling fluid parameters (e.g., the density and viscosity of drilling fluid). Downhole operating conditions can continually change and the operator must react to such changes and adjust operational parameters to optimize a drilling operation.

It is important to obtain information regarding the characteristics and properties of a formation prior to and/or during drilling, so that drilling operations can be designed and changed to optimize drilling. For example, different types of layers in a formation may require different operating parameters to maintain safety levels while preserving acceptable drilling times. Knowing in advance when a drill bit will start cutting into a certain formation or layer can be important to prevent hole instability or other drilling problems, and/or to adjust completion schemes. Information regarding formation layers and other properties is also important for other operations such as reservoir navigation. Knowledge of the positions and properties of stratigraphic layers facilitates well planning and also facilitates landing components at optimal locations.

SUMMARY

An embodiment of a method of predicting a location of one or more features of an earth formation during a downhole operation includes acquiring reference data and identifying one or more reference data sections, each reference data section corresponding to a feature of interest and having an associated depth or depth interval, deploying a drilling assembly and drilling a target borehole in the earth formation, and performing measurements during the operation by a downhole measurement device to generate measurement data. The method also includes performing one or more correlations of the one or more measurement data sections with one or more reference data sections; and predicting at least one of a depth of a subsequent feature of interest located beyond a current carrier depth and a point in time of a future event associated with the subsequent feature of interest based on the correlation.

An embodiment of a system for predicting location of one or more features of an earth formation during a downhole operation includes a carrier configured to be deployed in a borehole in the earth formation, the carrier including a drilling assembly configured to operate in a target borehole in the earth formation, a downhole measurement device configured to perform measurements during the downhole operation in the target borehole to generate measurement data; and a processor. The processor is configured to perform: acquiring reference data and identifying one or more reference data sections, each reference data section corresponding to a feature of interest and having an associated depth or depth interval; acquiring measurement data generated by performing measurements during the operation by a downhole measurement device; performing one or more correlations of one or more measurement data sections with one or more reference data sections; and predicting at least one of a depth of a subsequent feature of interest located beyond a current carrier depth and a point in time of a future event associated with the subsequent feature of interest based on the correlation.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Apparatuses and methods for performing, improving and/or optimizing drilling operations are discussed herein. Such embodiments provide effective techniques for anticipating when a drilling assembly will start cutting into certain features, such as formation layers, which can be important to prevent borehole instability or drilling problems, and for adjustments to drilling operations and/or completion schemes. The embodiments described herein may also provide effective techniques for facilitating reservoir navigation, e.g., by supporting the landing of a well. For example, monitoring of the stratigraphy can help to start the landing process at the correct depth.

Embodiments include predicting the distance between a drill bit or drilling assembly (or other downhole carrier or component) and a feature of interest by monitoring correlations or similarities between one or more measurements (i.e., measurement data) taken in a borehole during a downhole operation (by way of non-limiting example, a drilling, geosteering and/or reservoir navigation operation) and reference data indicative of formation lithology or stratigraphy. In one embodiment, measurement data is compared to reference data taken from one or more reference boreholes. In one embodiment, the measurement data is compared to reference data generated from other measurement operations such as seismic and/or acoustic imaging operations or from combinations of reference borehole data and other measurement operations.

In one embodiment, measurement data such as well logs are monitored, and depth shifts and/or time shifts are calculated based on the correlations or similarities between measurement data and reference data. The shifts may be expressed as a function of depth of the reference borehole or as a function of time, which may be used to predict the position of formation layers or other features of interest. In one embodiment, for short depth intervals or strongly varying shifts, the difference in shift of an overlying layer or combination of shifts may be used to predict the position of a feature or features of interest. The function and/or shift can be used in combination to give a possible range of the position of the feature of interest. In addition to predicting expected locations of features of interest, comparison of reference data and measurement data from a borehole being drilled may be used to detect current lithology changes while drilling.

Figure 1:
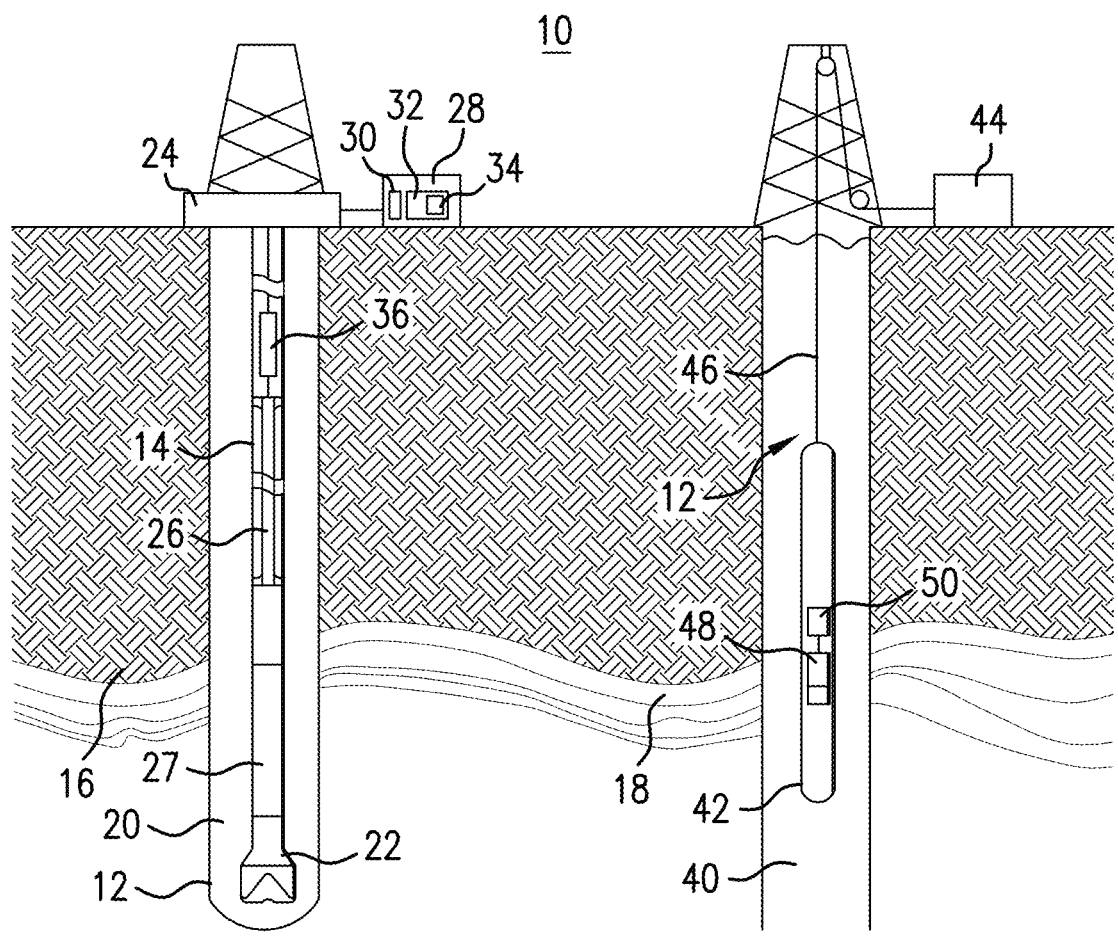
FIG. 1 depicts an embodiment of a subterranean well drilling and monitoring system.

Referring to FIG. 1, an exemplary embodiment of a drilling and monitoring system 10 is shown. A drill string 14 is disposed in a borehole 12, which penetrates at least one earth formation 16, which may include one or more stratigraphic layers 18. Although the borehole 12 is shown in FIG. 1 to be of constant diameter, the borehole is not so limited. For example, the borehole 12 may be of varying diameter and/or direction (e.g., azimuth and inclination). The drill string 14 is made from, for example, a pipe, multiple pipe sections or coiled tubing. The system 10 and/or the drill string 14 include a drilling assembly 20, which may be configured as a bottomhole assembly (BHA). Various measurement tools may also be incorporated into the system 10 to affect measurement regimes such as logging-while-drilling (LWD) or measurement-while-drilling (MWD) applications.

The drilling assembly 20 includes a drill bit 22 that is attached to the bottom end of the drill string 14 and is configured to be conveyed into the borehole 12 from a drilling rig 24. In the embodiment shown in FIG. 1, the drilling assembly 20 includes a drill bit 22 that may be operably connected to a positive displacement motor 26, also described as a mud motor 26, for rotating the drill bit 22. Although the embodiments described herein include a positive displacement motor, such embodiments may include any type of downhole motor, such as a turbine motor, and are not limited to drilling motors. Alternatively or in addition, the downhole equipment may be rotated by the drilling rig. Those skilled in the art will appreciate that while FIG. 1 is showing the downhole components in a particular sequence, the location of the some downhole components is variable so that the actual position of the downhole component may be different from what is shown in FIG. 1. In addition some of the downhole components may be optional and can be omitted in embodiments of the present invention.

Data and information regarding the formation 16 and/or stratigraphic layers 18 can be acquired by various measurement devices that may be included in the drilling assembly 20 and/or drill string 14, such as a downhole measurement tool 27 (e.g., a LWD tool). Exemplary devices include pulsed neutron tools, gamma ray measurement tools, neutron tools, resistivity tools, acoustic tools, nuclear magnetic resonance tools, density measurement tools, seismic data acquisition tools, acoustic impedance tools, formation pressure testing tools, fluid sampling and analysis tools, coring tools and/or any other type of sensor or device capable of providing information that can be used to identify or estimate formation features. Other sources of information include formation information inferred from cuttings.

The drilling assembly 20, measurement tool 27 and/or other components of the string 14 include, or are connected to, means for communicating signals to receivers such as a user and/or a processor located at a surface location or disposed downhole. For example, the drilling assembly 20 including the drill bit 22 and/or measurement tool 27 is connected in communication with a surface processing unit 28 or other processor. The surface processing unit 28 is configured to receive, store and/or transmit data and signals, and includes processing components configured to analyze data and/or control operational parameters. In one embodiment, the surface processing unit 28 is configured to control the drilling assembly 20 and receive data from the measurement tool 27 and any other downhole and/or surface sensors. Operational parameters may be controlled or adjusted automatically by the surface processing unit 28 in response to sensor data, or controlled by a human driller or remote processing device. The surface processing unit 28 includes any number of suitable components, such as processors, memory, communication devices and power sources. For example, the surface processing unit 28 may include a processor 30 (e.g., a microprocessor), and a memory 32 storing software 34. In addition or as an alternative to surface processors, processing capability may be located downhole, for example, as downhole electronics 36, which may perform all or some of the functions described in conjunction with the surface processing unit 28.

Signals and data may be transmitted via any suitable transmission device or system, such as various wireless configurations as described above and wired communications. Other techniques used to transmit signals and data include wired pipe, electric and/or fiber optic connections, mud pulse, electromagnetic and acoustic telemetry.

Components of the system 10 are used to predict formation layers and changes in lithology using the measurement data in conjunction with reference data. The reference data may be based on measurements performed in the borehole, or pre-existing lithology information taken from the borehole, the surface and/or at least one other borehole (e.g., a reference borehole or offset borehole).

In one embodiment, one or more reference boreholes 40 may be located near the borehole 12 or at a location in which the reference borehole 40 extends through the formation. As shown in FIG. 1, the reference borehole 40 is a pre-existing borehole that had been drilled prior to the current operation in which the borehole 12 is being drilled. For example, the reference borehole is an offset well, an injection well, an exploratory borehole or another production borehole. Notably, the boreholes 12 and 40, even though shown in FIG. 1 as vertical boreholes, may have some curvature and deviations from the vertical direction. For example, boreholes 40 and/or 12 may have azimuth and inclination that vary along the axis of the boreholes.

Information regarding the formation 16 and/or the stratigraphic layers 18 may be acquired from measurements taken by the measurement tool 27 in conjunction with reference data acquired via the reference borehole 40. Although the reference borehole 40 is shown as a pre-existing well located proximate to the borehole 12, it is not so limited. For example, the reference borehole 40 may be a borehole located at a different but similar formation. In another example, the reference borehole 40 may be drilled at about the same time as the borehole 12. In this case, real time measurements may be acquired during drilling of the reference borehole 40 for use in controlling or adjusting operational parameters used in drilling the borehole 12. Data and information regarding the formation 16 and/or stratigraphic layers 18 can be acquired via the reference borehole 40 by a variety of devices and techniques. Such techniques include, for example, MWD measurements, LWD measurements, wireline measurements, core samples, fluid samples, cutting samples, and others. For example, as shown in FIG. 1, data regarding the formation 16 is acquired by a downhole tool 42 such as a well logging tool connected to surface equipment and a surface processing unit 44 by a wireline 46.

Various sensing or measurement devices may be used to collect formation data. For example, one or more parameter sensors (or sensor assemblies such as LWD subs) are configured for measurements relating to the formation, borehole, geophysical characteristics and/or borehole fluids. This data may include resistivity, dielectric constant, water saturation, porosity, density, permeability, natural and spectral radioactivity, pulsed neutron data, nuclear magnetic resonance, chemical composition, acoustic velocity and acoustic travel time.

An exemplary downhole tool 42 is a gamma ray logging tool that includes at least one radiation detector 48. Sensors such as the downhole tool may be connected in communication with a surface processing unit 44 and/or electronics 50 for storing, transmitting and/or processing signals and/or data generated by the tool.

Various components for drilling, measurement and other functions are disposed downhole by a carrier, such as the drilling assembly 20, string 14 and the downhole tool 42, but are not so limited, and may be disposed with any suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

While drilling a well such as the borehole 12, it can be important to know in advance when a certain layer 18 will be drilled, e.g., shortly before the bit 22 will start to cut into a layer. Individual layers or groups of layers may be of particular interest in that they can impact the performance of a drilling operation. For example, experience from drilling previous wells (e.g., the borehole 40) show that drilling problems may be expected in a certain layer, e.g. kicks in highly overpressured formations (such as sand bodies exhibiting buoyancy-induced overpressure), stuck pipe in sloughing shale or coal formations, losses when drilling into depleted formations, or excessive bit wear when hitting hard calcite stringers. Knowing that this particular formation is approached, drilling parameters can be adjusted accordingly to ensure safe drilling of this formation.

In another example, approaching the reservoir or particular intervals within the reservoir may require changing a completion scheme, the mud type, and/or reservoir navigation parameters. Knowing in time that this particular formation is being approached allows for adjustment and optimization of the completion scheme, mud type, and/or the navigation path of a drilling assembly. In yet another example, knowing in time that a particular feature or layer is being approached allows for replacement of the drilling assembly 20 or parts of the drilling assembly 20. For instance, the drilling assembly 20 might be changed to a so-called coring assembly configured to take cores from that particular feature or layer. Knowing early that the particular feature or layer is approaching allows to take complete cores including the uppermost part of the feature or layer which usually is missed if the information that the feature or layer is approaching is not present.

In cases where a formation includes simple layer-cake geology with horizontally flat layers of constant thickness, a reference borehole can provide information on the position of the tops and bottoms of individual layers, which may be able to simply be projected from one location to other drilling locations. In addition, 3D seismic data sets may be used to transfer formation information from an offset well to a target well. However, ideal layer cake geology with horizontally flat lying layers of constant thickness rarely exists, and such a simple projection may only be applied in cases where boreholes are spaced very closely, if at all. Depending on the geological setting, the thickness of layers may vary laterally, and layers may be inclined or faulted and thus not perfectly horizontal. Moreover, layers will not extend indefinitely, i.e. single layers may form isolated lenses or die out. Faults may also displace the layers and further complicate the situation.

Figure 2:
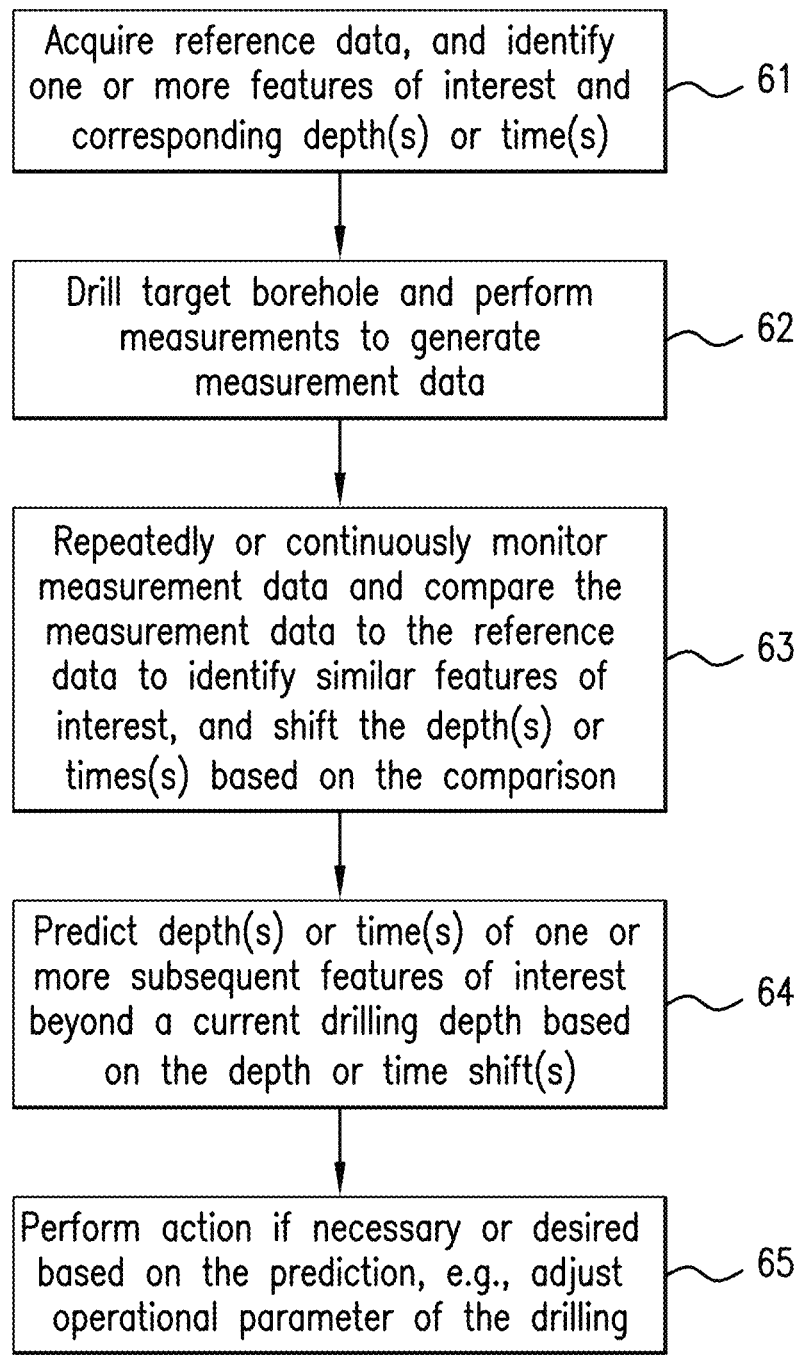
FIG. 2 is a flowchart depicting a method of monitoring and controlling a drilling operation.

FIG. 2 shows an embodiment of a method 60 of monitoring and controlling a drilling operation. The method includes manually, automatically, or at least semi-automatically monitoring characteristics of a formation such as the stratigraphy of the formation, as a borehole is drilled. The method 60 also includes predicting a depth, location or time at which a change in lithology or stratigraphy is going to be encountered during drilling, e.g., when or where a new or different stratigraphic layer will be encountered. The monitoring and prediction are performed by comparing measured data taken continuously or periodically during drilling, and comparing the measured data to reference data taken from another borehole (referred to as a reference borehole). This comparison may be automatically performed by a processor, which responds to predicting a change in stratigraphy by alerting a user (human or another processor) that a drill bit or drilling assembly is approaching a new layer and/or adjusting drilling operational parameters if necessary. The method 60 facilitates safe and effective drilling, reduces the amount of subjective interpretation, and may reduce the workload of analysts in predicting stratigraphic changes. The method 60 is applicable to various types of formations, such as layered formations having varying degrees of thinning or thickening of layers, dipping and the presence of faults.

The method 60 may be performed by a processor such as the surface processing unit 28, but is not so limited. Any suitable processor or processing device capable of receiving measurement data during drilling may be used. The method 60 includes one or more stages 61-65. In one embodiment, the method 60 includes the execution of all of stages 61-65 in the order described. However, certain stages may be omitted, stages may be added, or the order of the stages changed.

In the first stage 61, reference data is acquired from a suitable source or sources. Such reference data may be acquired from pre-existing data taken from a borehole being drilled, from a surface location and/or from a reference borehole.

In one embodiment, the reference data is taken from one or more pre-existing reference boreholes. The one or more pre-existing boreholes, in one embodiment, are located in the same or a similar formation as a borehole that is being drilled or planned (referred to as the target or current borehole).

Reference data includes various types of data and information acquired from the one or more reference boreholes. Exemplary reference data discussed herein includes well logs such as gamma ray logs taken from a reference borehole. However, any suitable data or information that reflects changes in lithology or stratigraphy may be used. Examples of suitable data include well logs, such as resistivity, acoustic compressional or shear slowness, formation density, magnetic resonance, pulsed neutron, gamma ray, spontaneous potential, and neutron porosity logs, or a combination thereof. Other types of data that can be used include measurement of borehole or drilling parameters, measurements of fluid pressure or fluid composition, which can provide indications of a change in lithology. Borehole data may be acquired by simultaneously measuring the toolface of one or more sensors, e.g. to create images of the borehole environment or as bulk data where a toolface sensitivity does not exist or is ignored.

In one embodiment, seismic and/or acoustic data taken before or during the drilling operation, using surface and/or downhole components, are acquired as the reference data. For example, the reference data includes vertical seismic profiling data, seismic while drilling data, and/or acoustic impedance data. In one embodiment, features of interest representing changes in lithology and/or stratigraphy are identified, e.g., marked on the reference data, and their depth in the reference borehole is stored. In the embodiments described herein, "depth" refers to a distance along the path of a borehole, e.g., a distance from the surface to a selected location along the borehole. Depth may refer to a distance along a path of a horizontal or deviated borehole, or a borehole having a combination of vertical, deviated and/or horizontal sections. Depths described in various examples discussed herein are true vertical depths (TVD) or true stratigraphic depths (TSD). Any other concept to describe distance in the subsurface as known in the art may be used (e.g. measured depth, driller's depth) and are all expressed by the single term depth. Those skilled in the art will appreciate that time and depth may be correlated by the rate of penetration. Thus, by knowing the ROP, time can be re-calculated as depth or vice versa. In addition, the term depth or time as used herein may refer to a single depth or time value or a depth or time interval.

The features of interest, in one embodiment, represent a change in lithology or stratigraphy, e.g., an interface between two layers. Such features of interest do not necessarily have to be the top or base of a particular layer or stratigraphy unit. For example, characteristic sedimentological features such as fining-up sequences show characteristic patterns on, for example, gamma ray logs. If the feature of interest (e.g., a change from one stratigraphical unit to another) is not marked by a significant change in lithology or is otherwise not distinctly defined by one type of reference data, a combination of types of data may be used (e.g., a gamma ray log in conjunction with a resistivity log).

In the second stage 62, a borehole (referred to as a target borehole or current borehole) is drilled in the formation. For example, the string 14 and/or the drilling assembly 20 are disposed downhole, e.g., during a drilling or logging-while-drilling (LWD) operation. The string 14 may be configured as any desired type, such as a measurement string or completion string.

During drilling, various measurements are taken, from which measurement data is generated. Such measurements may include operational measurements, such as flow rate, fluid characteristics (e.g., density), pressure and temperature. Other measurements include formation measurements such as well log measurements described above. For example, a measurement tool such as a pulsed neutron tool is disposed downhole and measurements are taken continuously or repeatedly, or a gamma ray logging tool is disposed downhole and measures naturally occurring gamma radiation, generating a gamma ray log. Other measurements include dynamics data such as weight-on-bit, torque-on-bit, rate of penetration, rotational velocity (RPM) or other dynamics measurements known in the art. The measurement log may be a single log from a single well, or a combination of logs from different wells or multiple logs taken in one well. The data may be combined with data from other sources such as data that is acquired at surface (e.g. seismic data).

In the third stage 63, the measurement data is continuously or repeatedly monitored, and reference data and the measurement data are repeatedly, continuously or at least substantially continuously compared as the target borehole is drilled. Continuous monitoring, in one embodiment, includes comparing measurement data to reference data after measurement data is received and/or processed into a suitable format for analysis (e.g., immediately after or upon receipt of the measurement data is received or processed).

In one embodiment, the measurement and reference data are compared to identify similar features, such as groups or sections of data that have the same or similar patterns of magnitude as a function of depth or time. The depth or time of the section of reference data is noted and the depth or time of the corresponding section of measurement data is noted, and the time or depth shift is calculated between the corresponding features in the reference data and the measurement data.

For example, a cross-correlation algorithm is applied to calculate the time or depth shift. Specific parameters of the algorithm, e.g. window sizes, may be adjusted for the local geological situation, e.g. the maximum expected time or depth shift.

In cases where large time or depth shifts or strongly varying time or depth shifts are expected, a "guided" analysis may be applied, i.e. an analyst or other user supervising the automated system may manually pick one or more correlations. Alternatively, the analysis may be completely or partly executed by a user or analyst. This may increase the reliability of the analysis in some cases. The correlations defined by the algorithm run by a processor and/or defined by the user are analyzed and a time or depth shift function may be defined. The depth or time shift function defines the amount of time or depth shift as a function of time or depth of the reference borehole. The time or depth shift function can be an analytical function having a wide range of forms (e.g. linear, exponential, polynomial) or combination of forms and reflect the depositional environment, e.g. thinning or thickening of the sequence, or dipping. The function may also include discrete values such as a table with one column representing time or depth and another column representing time or depth shifts. This function can be applied to predict the position of features of interest in regions of the formation that have not yet been drilled or encountered.

In the fourth stage 64, predictions are performed to identify expected features of interest that may be encountered during drilling. In one embodiment, after the depth or time shift has been calculated, features of interest, such as changes in lithology or interfaces between layers, are identified in the reference data at subsequent depths or times and the depths or times of the subsequent features of interest are noted. The noted depths or times are shifted based on the previous shifts, e.g., according to the depth or time shift function. These shifted depths or times represent the predicted depths of features of interest.

The features of interest may be defined as formation or reservoir features, and/or events. Accordingly, "features" or "features of interest" as described herein may encompass the actual features (e.g., stratigraphic layers, changes in lithology or facies, formation zones having particular characteristics, and/or surfaces in the formation), and may additionally or alternatively encompass events associated with such features. For example, events include penetrating a change in lithology or facies of the formation, a surface of a stratigraphic layer, and/or a surface of a zone with relatively high pressure.

In the fifth stage 65, various actions may be performed in response to the predictions, such as preventive or corrective actions to address a predicted layer depth or time. In one embodiment, the processor transmits and/or displays the predicted features and their corresponding depths or times (e.g., as an alert or alarm, or as a report) to allow an operator or user to adjust operational parameters if needed, such as changing fluid pressure, fluid composition, weight on bit and/or rotational speed. Other changes may include changes in equipment, such as changing the drill bit or drill string components. In another embodiment, actions include making changes to reservoir navigation operations, e.g., by steering a drilling assembly to change the path of the borehole and/or updating the planning for landing of the well. Another action that may be performed is updating a stratigraphic model of the formation to correct the depth(s) of formation layers.

In one embodiment, the processor automatically changes operational parameters at the appropriate time to react to the feature of interest. The alert and automatic adjustments may be performed in the alternative or together.

Depending on the results of the analysis, a corrective or preventive action may not be necessary. For example, when the predicted depth of a formation layer or feature is consistent with the expected depth, no action may be required and monitoring continues. In one embodiment, once the prediction is made, the processor alerts or otherwise informs an analyst or other user when the drill bit or drilling assembly is approaching a feature of interest. A threshold for the generation of an alert can be implemented so that once the predicted distance is smaller than the threshold, an alert is given. The threshold may be a depth or time value (e.g., the feature of interest is expected in "x" minutes or at "y" depth). With continuous monitoring of time or depth shifts, the prediction may be updated as features of interest are encountered, and accordingly alerts may be updated. Other information that can be imparted to a user via an alert includes, e.g., indication that a formation top or other feature has been reached, that a predicted time or depth has been reached but the feature has not yet been drilled, that the actual drilling time or depth is longer or deeper than the predicted drilling time or depth (predefined distance), and/or that an expected feature is missing.

Figure 3:
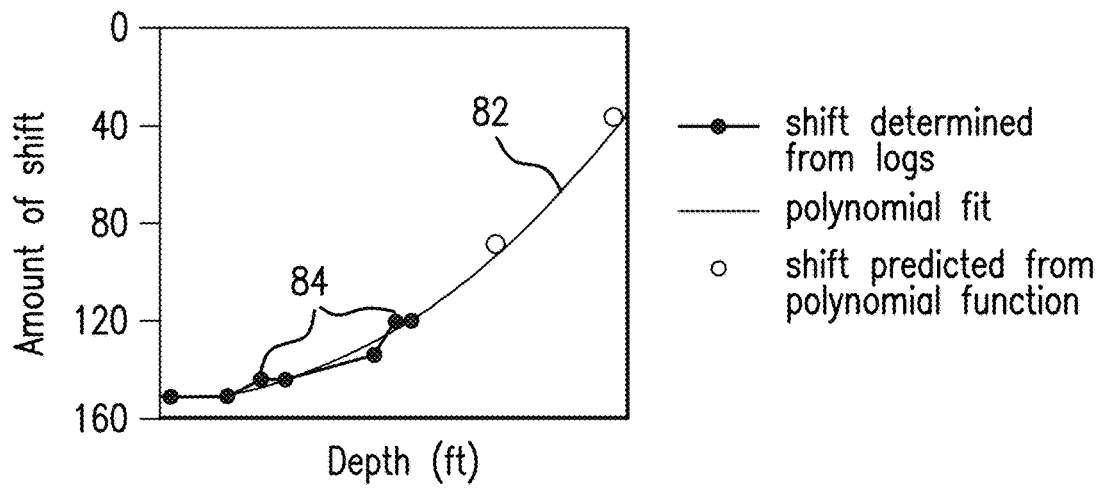
FIG. 3 illustrates aspects of an exemplary application of the method of FIG. 2, which includes calculating a depth shift function.
Figure 3:
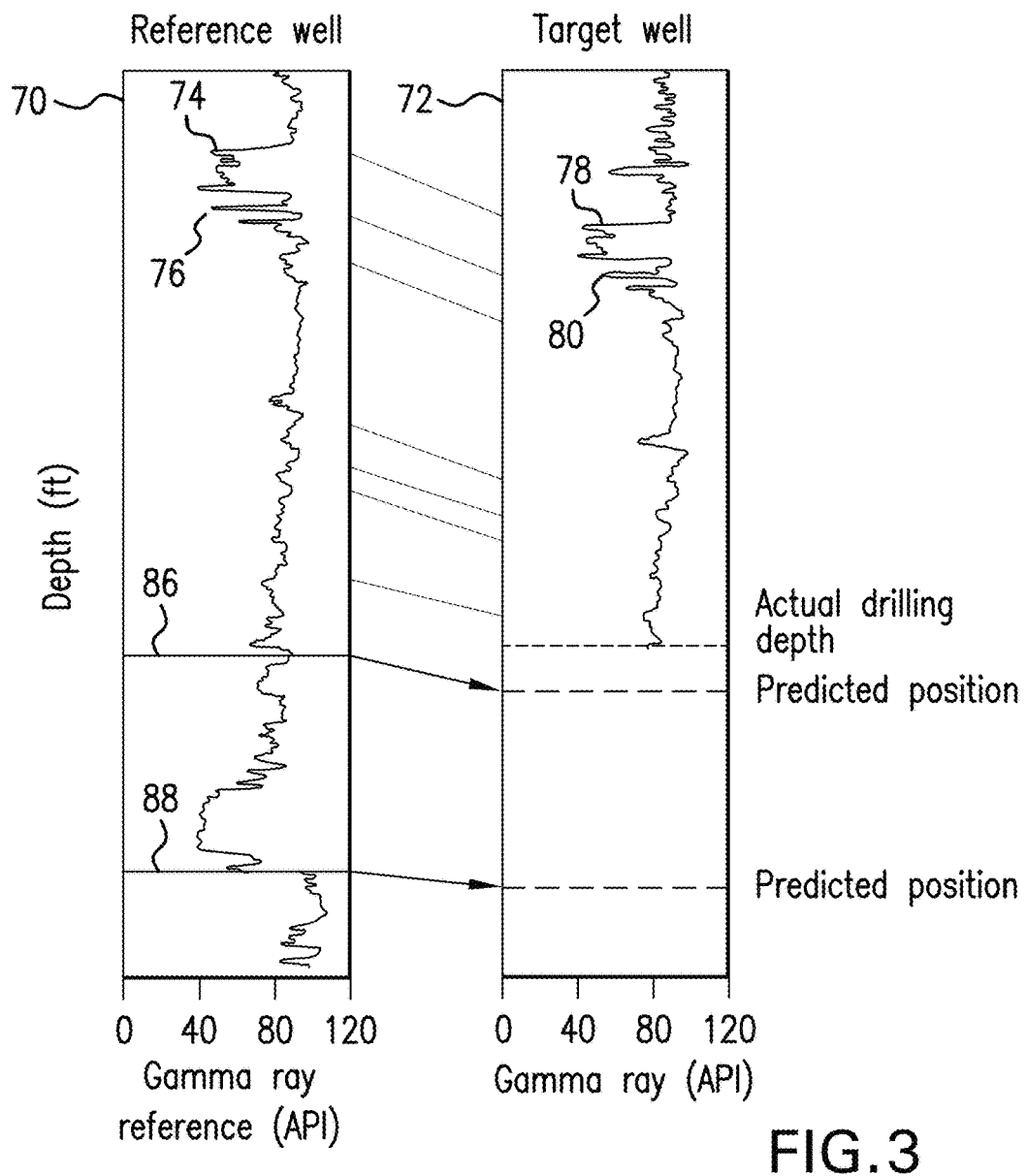
Figure 4:
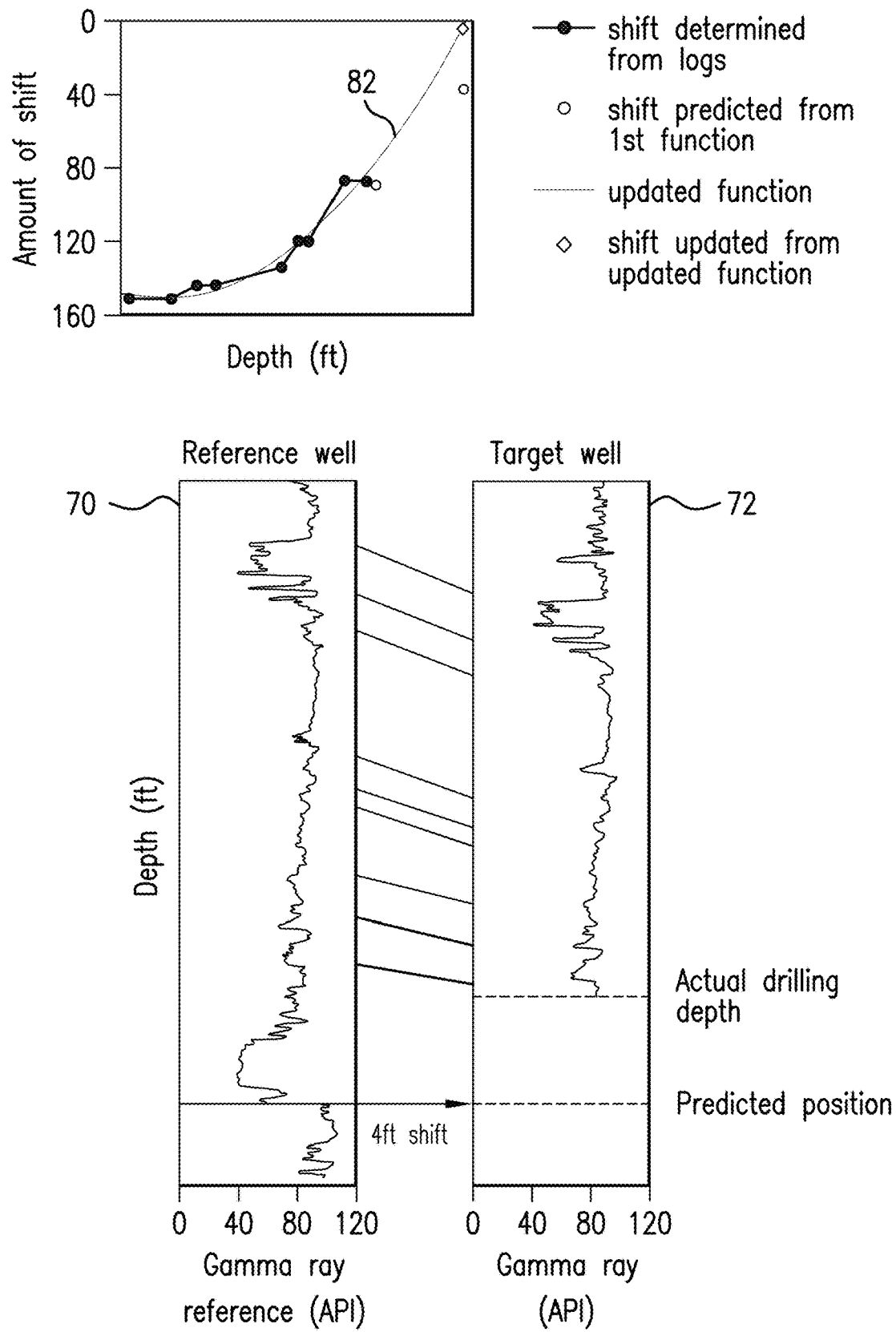
FIG. 4 depicts an exemplary application of the method of FIG. 2, which includes calculating and updating of the depth shift function of FIG. 3.

FIGS. 3 and 4 illustrate an exemplary application of the method 60. In this example, the reference data includes a gamma ray log 70 taken from a pre-existing borehole (referred to as the reference log). The measurement data includes a gamma ray log 72 taken during drilling (referred to as the measurement log). The reference and measurement logs show the amount of gamma radiation in American Petroleum Institute (API) units as a function of depth.

Portions of the reference log having patterns or values corresponding to features of interest are identified and marked. In this example, features 74 and 76 of the reference log 70, which show distinctive or identifiable patterns, are selected. The measurement log 72 is continuously monitored for similar features. Similar features 78 and 80 of the measurement log are selected, and correlations between the logs and their corresponding depth shifts are marked. A depth shift is calculated for feature 78 based on the difference in depth between features 74 and 78, and a depth shift is calculated for feature 80 based on the difference in depth between features 76 and 80.

A depth shift function 82 is generated based on the shift found from the correlation versus the depth position on the reference log. Data points 84 show the amount of depth shift of each feature and the feature's depth according to the reference log 70. Once a sufficient number of depth shifts are calculated, the function 82 is estimated that is the best fit to the points 84. In this example, a second order polynomial function was found to best fit the data points 84.

Portions of the reference log corresponding to subsequent features that have not been encountered (i.e., below the actual drilling depth) are selected from the reference log, and the depth or depth interval of each subsequent feature is identified. In this example features 86 and 88 of the reference log 70 are identified. The function 82 is applied to the two features of interest 86 and 88, and a predicted position of these features on the target well is calculated. In this example, the function 82 suggests shifting the upper feature 86 downward by 89 feet and the second feature downward by 37 feet.

FIG. 4 shows that by continuing the monitoring as the drilling progresses deeper into the formation (or otherwise further along a drill path), more correlations are available and the function 82 can be updated. The update confirms the shift of the upper feature 86 but now suggests a downward shift of 4 feet for the lower feature 88. Compared to manual picks carried out on the final log of the target well, the position of the upper feature 86 was predicted to be 8 feet lower than the position picked by manual analysis, and the feature 88 was predicted to be 15 feet lower than the manually picked position.

In the examples from FIGS. 3 and 4, a polynomial function was used to fit the depth shifts. The type of the correlation function may vary for different geologies, such as being a linear positive or negative function, a constant shift with depth, a logarithmic or exponential function or a polynomial fit. The correlation function may also include (partly or in its entirety) discrete data such as a table. The type of the correlation function may be anticipated based on the geological information, e.g. from seismic data interpretation or a reservoir or lithology model.

Figure 5:
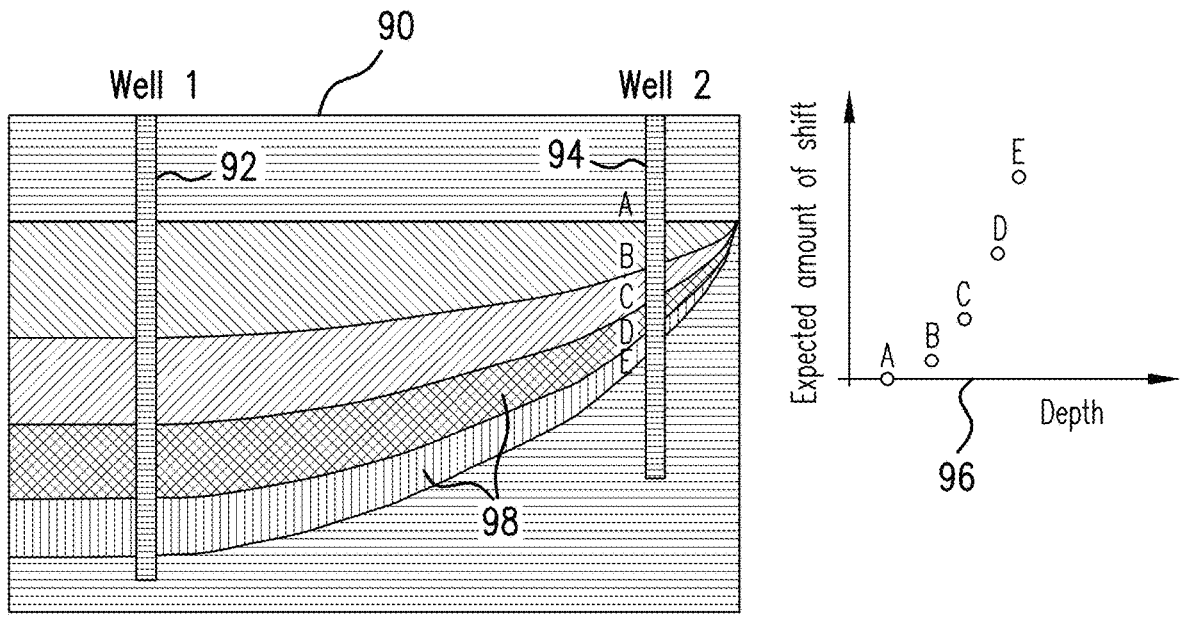
FIG. 5 depicts an exemplary depth shift function corresponding to a formation model.
Figure 6:
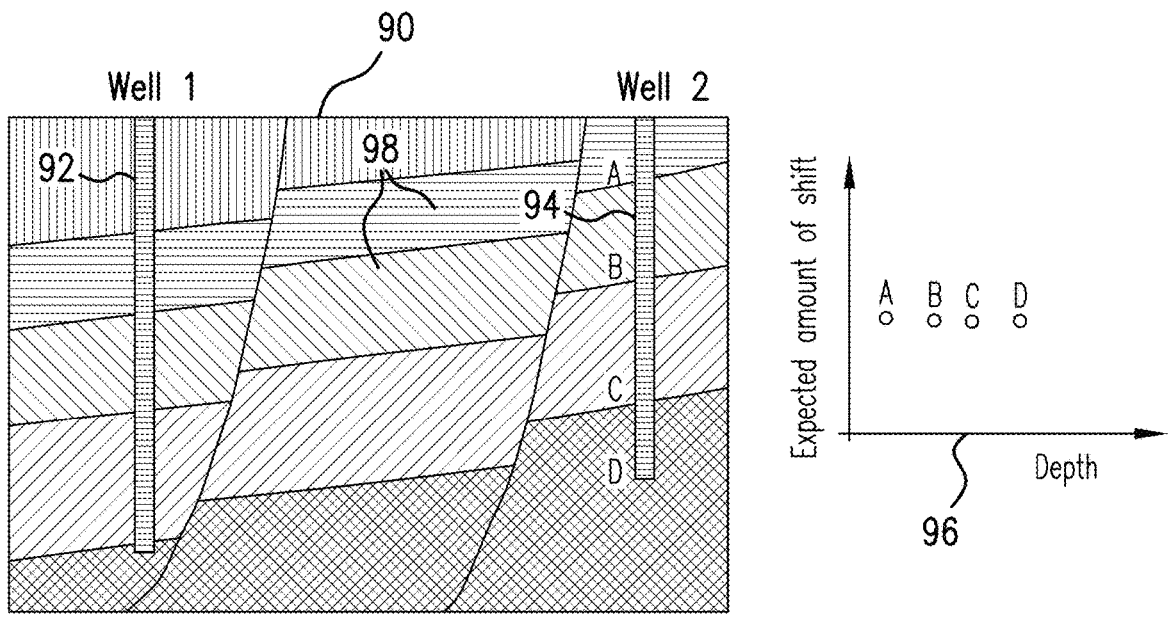
FIG. 6 depicts an exemplary depth shift function corresponding to a faulted formation model.

FIGS. 5 and 6 illustrate depth shift functions for two examples of a lithology model 90. FIG. 5 shows the lithology model 90 as thinning as a formation extends from a reference borehole 92 ("Well 1") towards a target borehole 94 ("Well 2"). A plot 96 of depth shifts corresponding to this model shows a function of increasing shift with increasing depth, which corresponds to thinning of layers 98 as shown.

In instances where the layer thicknesses are relatively constant, the function would be expected to be substantially zero. Where layer thicknesses are relatively constant, but the depth of the layers change, a relatively constant horizontal function is expected. For example, FIG. 6 shows the model 90 having a faulted lithology, where layers 98 have relatively constant thicknesses but change depth. In this example, if the faults intersect the underground between boreholes 92 and 94, the depth shift of the lithology should be expected to be more or less constant, and thus the correlation function of plot 96 is a relatively horizontal constant line.

In instances where the drilled interval is too short to define a function, or where the depth shifts do not show a systematic behavior that allows calculating a function, a simplified approach may be applied. In such instances, the depth shift and/or variations in thickness of only a few layers are monitored and the observed changes in depth position and thickness are applied to predict the position of the feature of interest.

Figure 7:
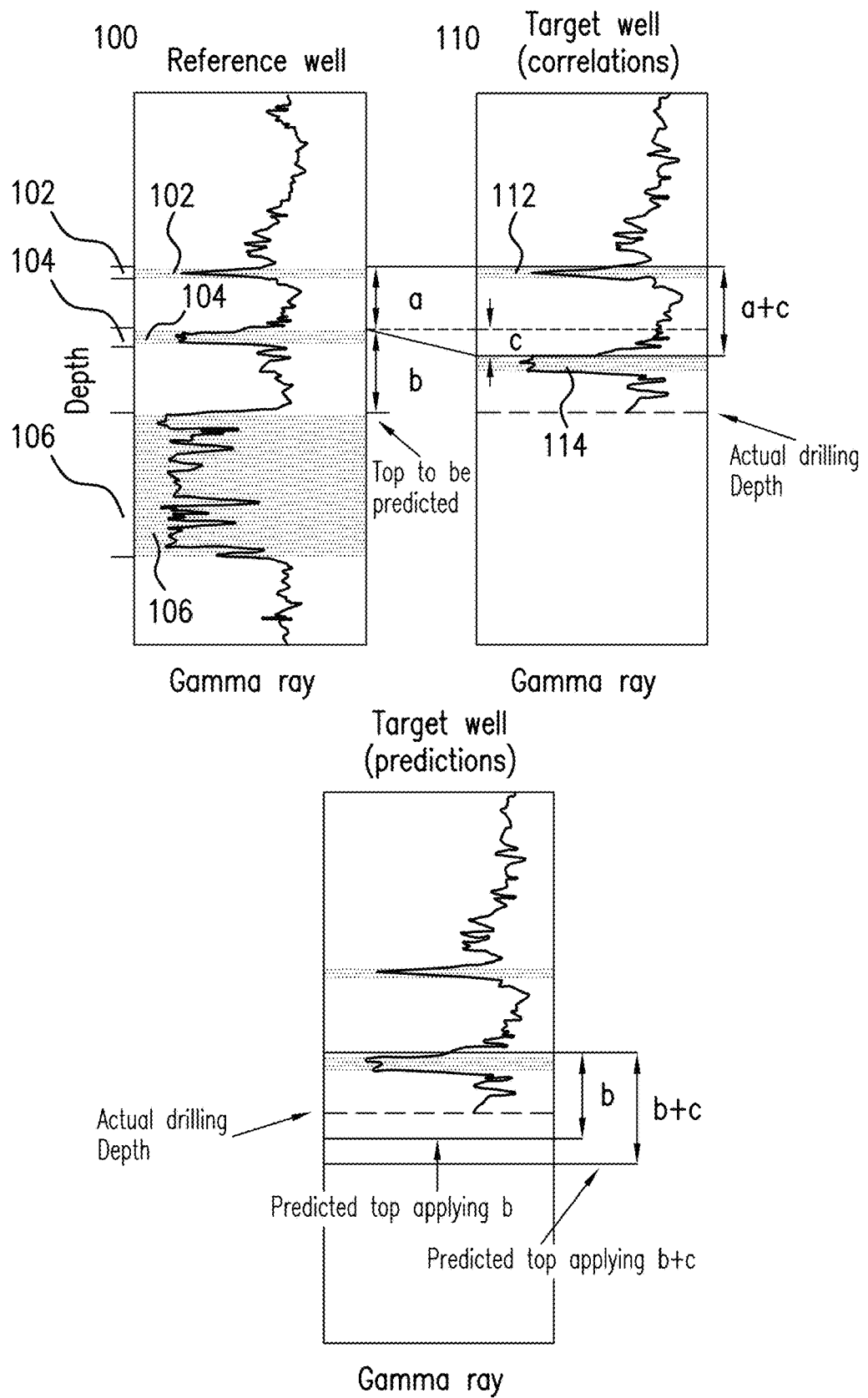
FIG. 7 depicts aspects of an example of the method of FIG. 2, which includes prediction of a location of a formation layer during drilling.

FIG. 7 provides a schematic example that includes reference data in the form of a reference gamma ray log 100 taken from a reference well. Three features of interest (shaded regions 102, 104 and 106) representing sand layers are present in the reference log 100. The distance between the top of the uppermost sand layer 102 and the middle sand layer 104 is "a", the distance between the middle sand layer 104 and the lowermost sand layer 106 is "b". In this example, the actual drilling depth in the target well has not reached the sand layer 106, and thus a prediction of the depth of the sand layer 106 in the target well is desired.

A target gamma ray log 110 is continuously or repeatedly monitored as the drilling depth advances. A first feature of interest 112 correlates with the reference feature 102, and a second feature of interest 114 correlates with the reference feature 104. These correlations are illustrated as lines between the correlated features. The depth shift is calculated as discussed above. The uppermost sand layer is at about the same depth between the two boreholes, and the middle sand layer is slightly deeper as the thicknesses of the layers change. The depth shift of the top of the middle layer is shown as "c".

Two approaches are shown for predicting the depth of the top of the lower sand layer 106. In the first approach, a predicted depth 116 of the lower sand layer is estimated based on the distance "b" between the middle and lower layers shown by the reference log, without considering the variations in layer thickness between the two boreholes.

In the second approach, changes in layer thickness are taken into account. The depth difference "c" is added so that the predicted depth 118 of the top of the lowermost sand layer is predicted using the distance "b+c" below the top of the middle sand layer. In one embodiment, both approaches are used to generate a possible range for the position of the lowermost sand layer. For example, using these approaches, the predicted depth of the lowermost sand layer is given as a range bounded by depths 116 and 118.

Predictions based on a depth shift versus depth function for various depth shift functions and predictions based on the simplified options can be made in conjunction or simultaneously to give a range of possible depth positions. Different shift versus depth functions may be weighted according to the likelihood of being applicable for a particular geological situation. The applicability of each function should be estimated based on the underground geology. A combined analysis (e.g., adding all depth shift functions weighted by a measure of the likelihood for being applicable) can then be used to assign uncertainty associated with each depth shift.

FIGS. 8-11 illustrate examples of automatic or semi-automatic prediction of features of interest. In automatic embodiments, a processor continuously monitors measurement data for patterns corresponding to features of interest and performs predictions of expected features of interest at locations or depths beyond a currently drilling location or depth. In such embodiments, the processor may send updates or alerts to a user regarding predicted features of interest, and/or perform automatic adjustments to the drilling operation is response to the predictions.

In semi-automatic embodiments, the processor may provide various levels or types of information to a user, which the user can use to perform manual predictions or manually adjust predictions provided by the processor.

Figure 8:
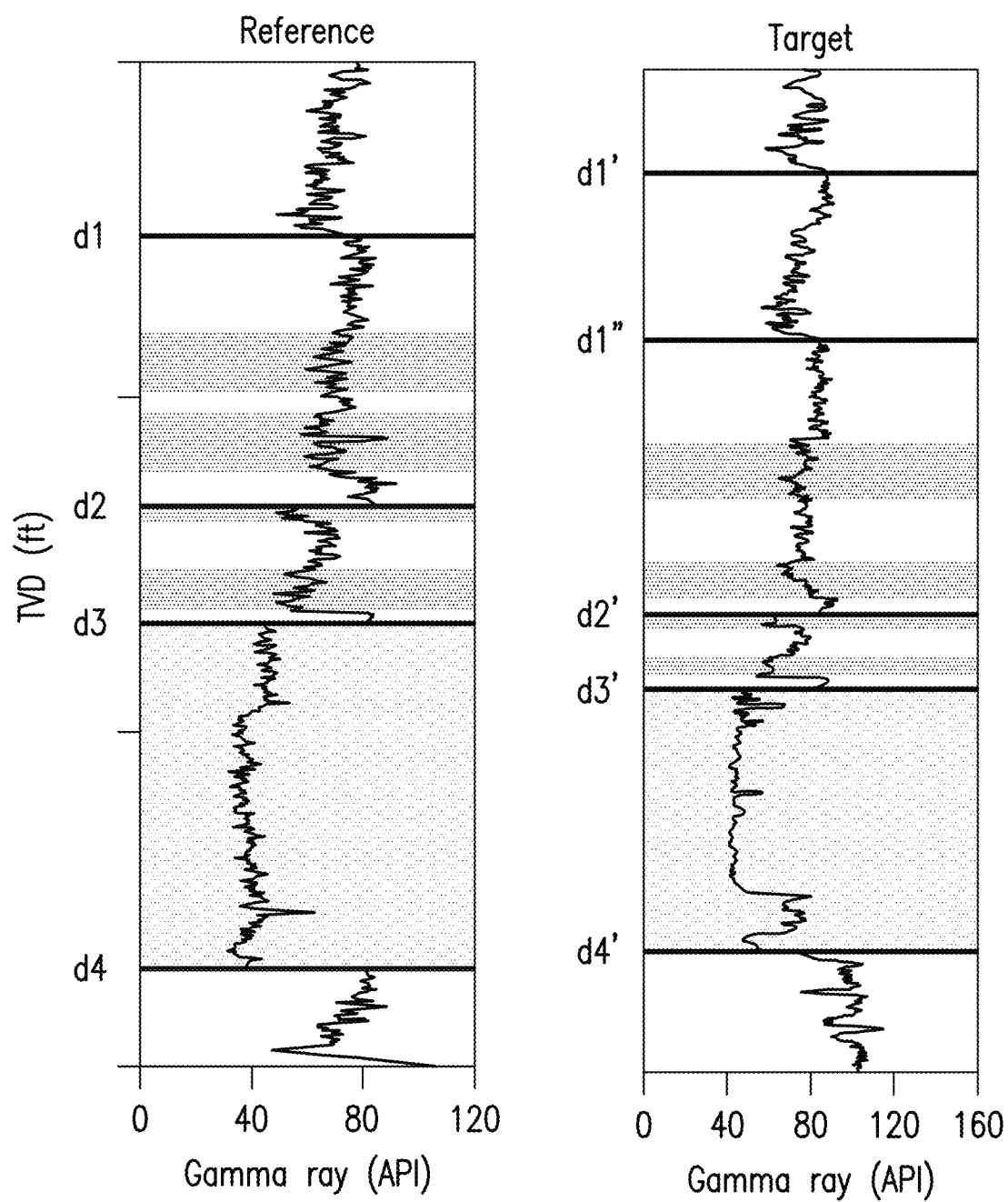
FIG. 8 depicts aspects of an exemplary method of identifying and predicting lithology changes and/or other features of interest in a formation during drilling.

One example is shown in FIG. 8. A reference log (in this example, a gamma ray log) is analyzed by a processor or user, and features of interest are pre-defined by marking changes or patterns in the reference log data before and/or during drilling. In the example of FIG. 8, four features of interest and their corresponding depths or depth intervals are identified, referred to as d1, d2, d3, and d4. The features of interest in this example are changes in lithology, e.g., tops and bottoms of different formation layers. Absolute and/or relative changes in the gamma ray response are calculated. The absolute and relative changes corresponding to the depths d1-d4 are summarized in the following table:

| | Expected Lithology Changes | |
|---|---|---|
| Depth | Expected change in gamma ray (absolute) | Expected change in gamma ray (relative) |
| d1 | 65 → 75 api | +15% → +35% |
| d2 | 80 → 55 api | −25% → −40% |
| d3 | 85 → 45 api | −45% → −60% |
| d4 | 40 → 80 api | +95% → +105% |

In one embodiment, the absolute and/or relative changes are used to define a threshold value of the changes or a range of the changes, which are compared to measured changes in the target log. During drilling, lithology changes are monitored by comparing the expected changes with observed changes in the reference log response of a target borehole. Absolute and/or relative changes that are within a selected range of the threshold or within the range of the changes are automatically detected and marked on the target log or noted otherwise. Absolute and relative changes corresponding to the depths d1-d4 are marked, which in the example are referred to as d1'-d4', which correspond to d1-d4 respectively. The absolute and relative changes marked in the target log are summarized in the following table:

| | Observed Lithology Changes | |
|---|---|---|
| Depth | Observed change in gamma ray (absolute) | Observed change in gamma ray (relative) |
| d1' | 70 → 90 api | +29% |
| d1" | 70 → 85 api | +21% |
| d2' | 85 → 60 api | −18% |
| d3' | 85 → 45 api | −47% |
| d4' | 55 → 100 api | +81% |

Figure 9:
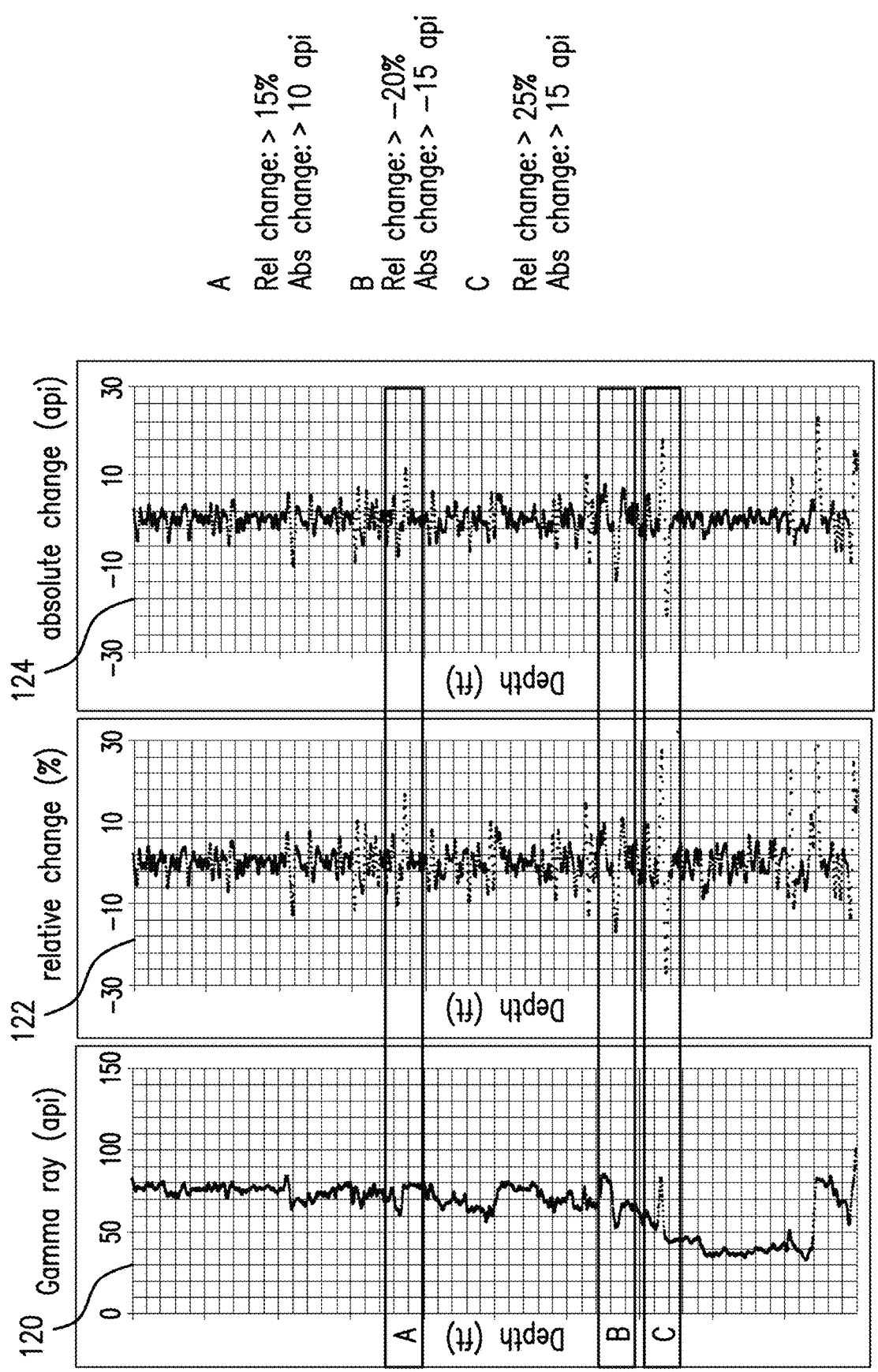
FIG. 9 depicts aspects of an exemplary method of identifying and predicting features of interest in a reference data set.
Figure 10:
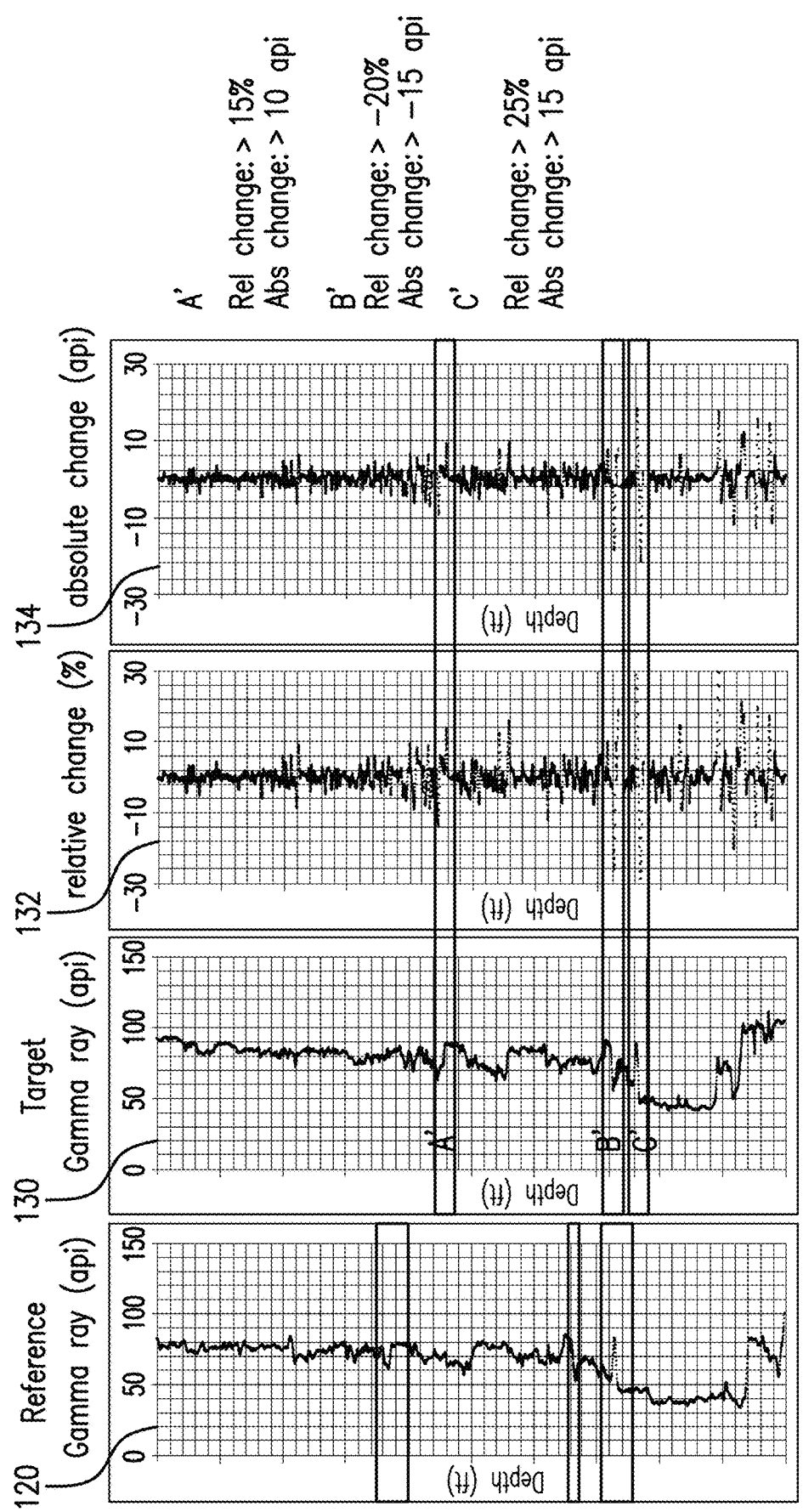
FIG. 10 depicts aspects of an exemplary method of identifying and predicting features of interest in a target borehole during drilling based on the reference data set of FIG. 9.

FIGS. 9 and 10 illustrate selection of features of interest from a reference borehole such as an offset well. The reference log is shown in track 120. A relative change log 122 and an absolute change log 124 are calculated, and changes with significant fingerprints corresponding to lithology changes or other features of interest are noted. These fingerprints and depth intervals are shown as A, B, and C.

During drilling, a target well log 130 is monitored and a relative change log 132 and absolute change log 134 are calculated as measurement data is received. Similar changes or fingerprints and their corresponding depths are noted as A', B' and C'. The fingerprints from the reference and target logs are compared and depth shifts are calculated.

Figure 11:
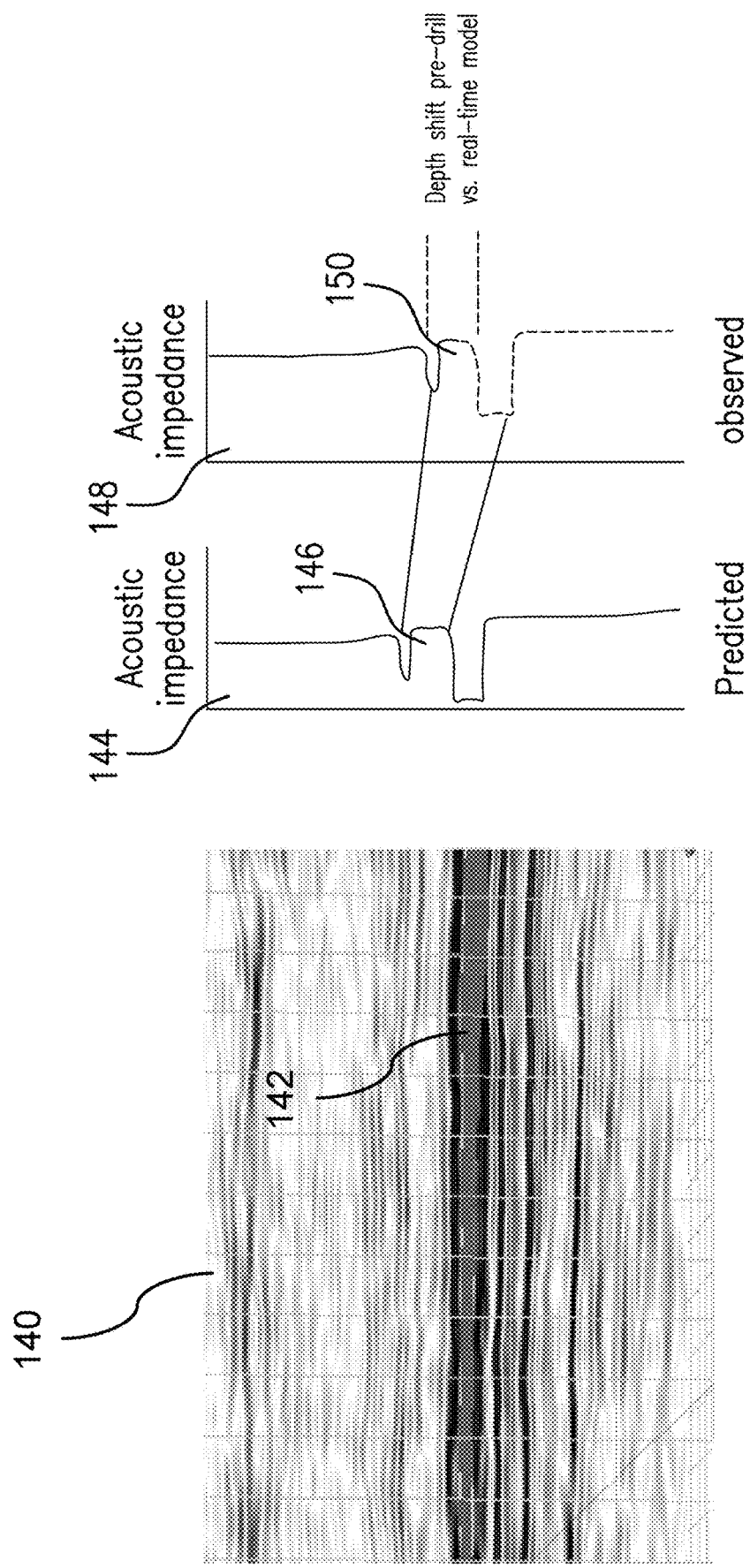
FIG. 11 depicts aspects of an exemplary method of identifying and predicting features of interest in a target borehole during drilling based on seismic data.

FIG. 11 illustrates another example of prediction of features of interest. In this example, seismic data using any suitable seismic technique is acquired. Exemplary techniques include surface and/or marine seismic surveys, borehole seismic and combinations thereof. An exemplary seismic image 140 is generated or acquired, which shows various seismic reflectors, one or more of which may indicate a feature of interest, such as a formation layer or surface. For example, the image 140 shows seismic reflectors 142 located at a depth interval. A reference acoustic impedance log 144 is generated that includes a pattern 146 (a reference pattern) at a depth based on the image 140 (TVD in this example) corresponding to the feature of interest. The predicted impedance log 144 and/or the seismic image 140 are considered the reference data in this example.

During drilling, various monitoring functions are performed, including performing borehole measurements during the drilling and computing an acoustic impedance log 148. The measured impedance log 148 is monitored for patterns that are similar to the reference pattern 146. In this example, the measured impedance log shows a pattern 150 that is similar to the reference pattern 146. These patterns are compared and a depth shift is calculated based on the difference in depth between the reference pattern 146 and the measured pattern 150. The comparison between the predicted and the monitored acoustic impedance can be used to update a seismic model during the drilling operation. This is extremely useful, for example, for landing a borehole during a reservoir navigation operation.

Figure 12:
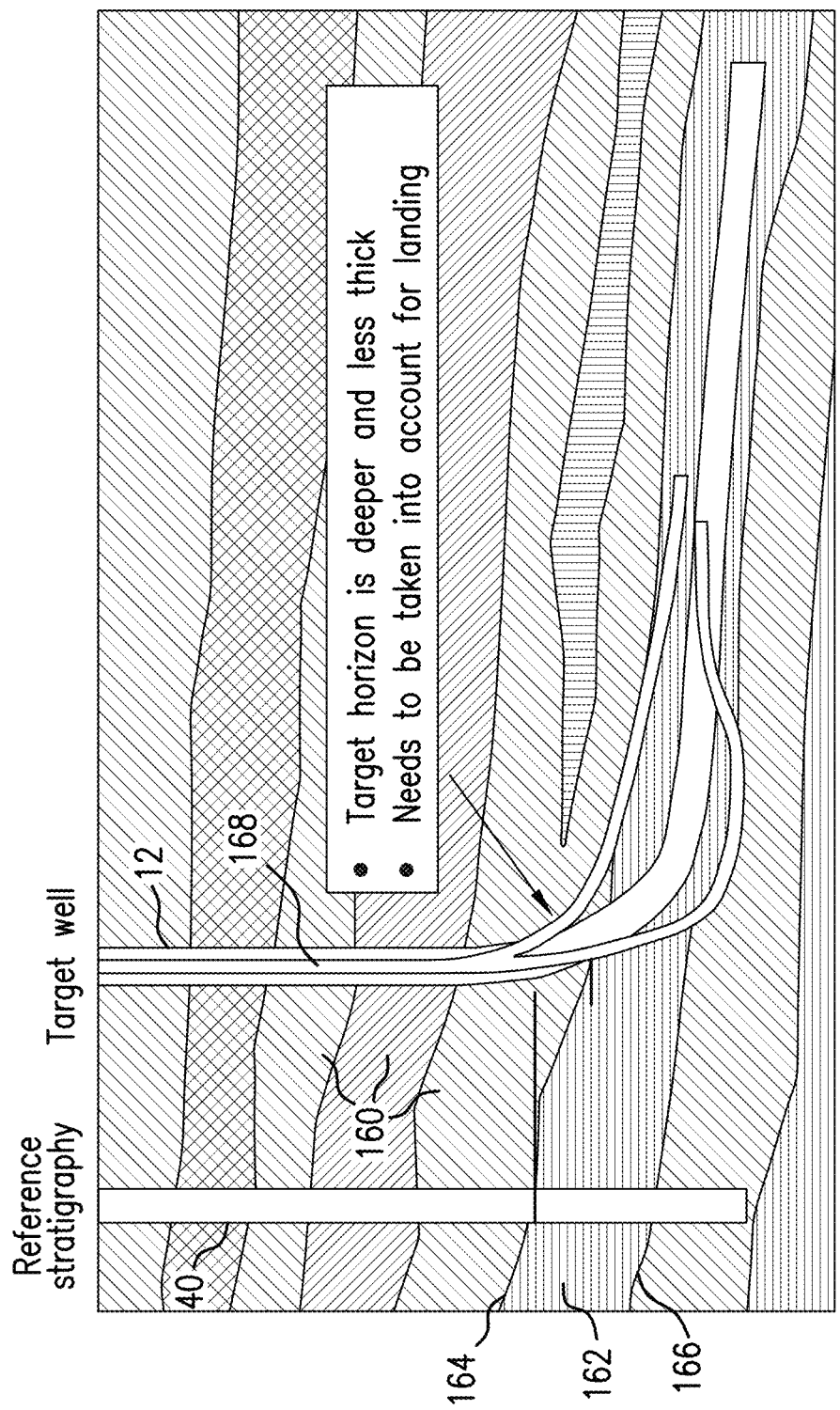
FIG. 12 depicts an exemplary application of embodiments to reservoir navigation operations.

As discussed above, the embodiments described herein provide valuable predictions of the depth or position of formation layers that are expected to be encountered during a drilling and/or reservoir navigation operation. An exemplary application of the predictions is reservoir navigation, which is a process in which a borehole is drilled along a path to direct or steer a drilling assembly into a desired formation layer. For example, as shown in FIG. 12, a borehole such as the borehole 12 is drilled through a formation that includes multiple formation layers 160. The borehole is drilled toward a target formation layer 162. A reference borehole (e.g., borehole 40) is used to acquire reference data that indicates the position of the target layer 162 bounded by an upper horizon 164 and a lower horizon 166. Using the systems and methods described herein, measurement data taken during drilling is shifted based on comparison with the reference data to predict the depth of the target layer ahead of the borehole. In this example, the target layer 162 under the drilled borehole is thinner and the upper horizon 164 is deeper than at the location of the reference borehole. This information is used to navigate the drilling assembly, e.g., by updating a planned drilling path 168, so that the borehole extends at least partially horizontally and is maintained within the target layer.

The apparatuses and methods described herein have various advantages over prior art apparatuses and techniques. Embodiments described herein provide effective ways of predicting locations and types of formations and/or stratigraphic layers that may be encountered during drilling. This allows drillers to know in advance when a component will enter a specific layer or layers, e.g., when a drill bit will start cutting into a certain formation or layer, which can be used to prevent hole instability or drilling problems or to adjust completion schemes. A user or operator may thus utilize embodiments described herein to make proactive decisions during an operation, e.g., decisions regarding drilling parameters, completion equipment, downhole components, mud properties, and/or steering a well. In connection with the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors, semiconductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method or parts of the method of the present invention. These instructions may provide for equipment operation, control, data collection and analysis and other functions deemed relevant by a system designer, owner, user, or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

What is claimed is:

1. A method of predicting a location of one or more features of an earth formation during a downhole drilling operation, the method comprising:
   acquiring reference data and identifying one or more reference data sections, each reference data section corresponding to a feature of interest and having an associated depth or depth interval, wherein the reference data includes measurements taken from a reference borehole;
   deploying a drilling assembly and drilling a target borehole in the earth formation separate from the reference borehole, and obtaining measurements during the downhole drilling operation using a downhole measurement device to generate measurement data;
   generating a depth shift function from correlation of one or more measurement data sections with the one or more reference data sections; and predicting a location of a subsequent feature of interest ahead of the target borehole by applying the depth shift function;

continuously updating the depth shift function and the predicted location as additional measurement data are generated during the downhole drilling operation; and at least one of automatically adjusting and changing operational parameters of the downhole drilling operation in response to the predicted location to react to the subsequent feature of interest.

2. The method of claim 1, wherein the reference data includes seismic measurements of the earth formation.

3. The method of claim 1, further comprising performing an action in response to predicting the location of the subsequent feature of interest, the action including at least one of: generating an alert, updating a plan for landing or steering the target borehole, updating or modifying a model of the earth formation, changing a rate of penetration of the drilling assembly, adjusting a drilling dynamics parameter, adjusting a drilling direction, adjusting one or more mud properties, changing, removing, or adding a downhole component, setting a casing, and adjusting the operational parameters.

4. The method of claim 1, wherein the one or more reference data sections include at least one of: a data value change exceeding or falling below a selected threshold, and a distinctive pattern of data values associated with the feature of interest.

5. The method of claim 1, wherein the correlation includes generating a data point for a depth shift as a function of depth or time.

6. The method of claim 1, wherein the feature of interest includes at least one of: a change in lithology or facies of the earth formation, a surface of a stratigraphic layer, and a surface of a zone with relatively high pressure.

7. The method of claim 1, wherein the correlation includes identifying the one or more reference data sections by calculating an absolute change in values of the reference data, calculating a relative change in the values, and correlating the absolute change or the relative change with the feature of interest.

8. The method of claim 7, wherein the correlation includes monitoring the measurement data and the additional measurement data and selecting a depth interval in which an absolute change in values of the measurement data is within a selected range of the absolute change in values of the reference data, or in which a relative change in values of the measurement data is within a selected range of the relative change in the values of the reference data.

9. A system for predicting location of one or more features of an earth formation during a downhole drilling operation, comprising:

a carrier configured to be deployed in a borehole in the earth formation, the carrier including a drilling assembly configured to operate in a target borehole in the earth formation;

a downhole measurement device configured to perform measurements during the downhole drilling operation in the target borehole to generate measurement data; and a processor configured to perform:

acquiring reference data and identifying one or more reference data sections, each reference data section corresponding to a feature of interest and having an associated depth or depth interval, wherein the reference data includes measurements taken from a reference borehole;

generating the measurement data by performing measurements during the downhole drilling operation using the downhole measurement device;

generating a depth shift function by correlation of one or more measurement data sections with the one or more reference data sections; and predicting a location of a subsequent feature of interest ahead of the target borehole by applying the depth shift function;

continuously updating the depth shift function and the predicted location as additional measurement data are generated during the downhole drilling operation; and at least one of automatically adjusting and changing operational parameters of the downhole drilling operation in response to the predicted location to react to the subsequent feature of interest.

10. The system of claim 9, wherein the processor is configured to perform an action in response to the drilling assembly approaching the predicted location, the action including at least one of: generating an alert, updating a plan for landing or steering the target borehole, updating or modifying a model of the earth formation, changing a rate of penetration of the drilling assembly, adjusting a drilling dynamics parameter, adjusting a drilling direction, adjusting one or more mud properties, changing, removing, or adding a downhole component, setting a casing, and adjusting the operational parameters.

11. The system of claim 9, wherein the one or more reference data sections include at least one of: a data value change exceeding or falling below a selected threshold, and a distinctive pattern of data values associated with the feature of interest.

12. The system of claim 9, wherein the correlation includes generating a data point for a depth shift as a function of depth or time.

13. The system of claim 12, wherein generating the data point for the depth shift includes constructing a curve, identifying a reference data section corresponding to the subsequent feature of interest, and calculating a depth in the target borehole of the subsequent feature of interest by applying a depth interval of the identified reference data section corresponding to the subsequent feature of interest to the curve.

14. The system of claim 9, wherein the correlation includes identifying the one or more reference data sections by calculating an absolute change in values of the reference data, calculating a relative change in the values, and correlating the absolute change or the relative change with the feature of interest.

15. The system of claim 14, wherein correlation of the one or more measurement data sections includes monitoring the measurement data and selecting a depth interval in which an absolute or relative change in values of the measurement data is within a selected range of the absolute or relative change the values of the reference data.

* * * * *